United States Patent
Wulfmeier et al.

(10) Patent No.: US 12,444,182 B2
(45) Date of Patent: Oct. 14, 2025

(54) TRAINING ACTION SELECTION NEURAL NETWORKS USING AUXILIARY TASKS OF CONTROLLING OBSERVATION EMBEDDINGS

(71) Applicant: DeepMind Technologies Limited, London (GB)

(72) Inventors: Markus Wulfmeier, Balgheim (DE); Tim Hertweck, Lauchringen (DE); Martin Riedmiller, Balgheim (DE)

(73) Assignee: GDM Holding LLC, Mountain View, CA (US)

(*) Notice: Subject to any disclaimer, the term of this patent is extended or adjusted under 35 U.S.C. 154(b) by 396 days.

(21) Appl. No.: 18/016,746

(22) PCT Filed: Jul. 27, 2021

(86) PCT No.: PCT/EP2021/071078
§ 371 (c)(1),
(2) Date: Jan. 18, 2023

(87) PCT Pub. No.: WO2022/023385
PCT Pub. Date: Feb. 3, 2022

(65) Prior Publication Data
US 2023/0290133 A1    Sep. 14, 2023

Related U.S. Application Data (60) Provisional application No. 63/057,795, filed on Jul. 28, 2020.

(51) Int. Cl.
*G06V 10/82* (2022.01)
*G06V 10/70* (2022.01)

(52) U.S. Cl.
CPC ............ *G06V 10/82* (2022.01); *G06V 10/87* (2022.01)

(58) Field of Classification Search
CPC ........ G06V 10/82; G06V 10/87; G06N 3/006; G06N 3/044; G06N 3/08; G06N 3/092; G06N 3/0455; G06N 3/048
(Continued)

(56) References Cited

FOREIGN PATENT DOCUMENTS

| JP | 2018-537880 | 12/2018 |
|---|---|---|
| JP | 2019-534517 | 11/2019 |
| WO | WO 2018/224471 | 12/2018 |

OTHER PUBLICATIONS

Gu et al., "Deep Reinforcement Learning for Robotic Manipulation" arXiv: 1610.00633, 2016, 9 pages (Year: 2016).*
(Continued)

*Primary Examiner* — Charlotte M Baker
(74) *Attorney, Agent, or Firm* — Fish & Richardson P.C.

(57) ABSTRACT

Methods, systems, and apparatus, including computer programs encoded on a computer storage medium, for selecting actions to be performed by an agent interacting with an environment to accomplish a goal. In one aspect, a method comprises: obtaining an observation characterizing a state of the environment, processing the observation using an embedding model to generate a lower-dimensional embedding of the observation, determining an auxiliary task reward based on a value of a particular dimension of the embedding, determining an overall reward based at least in part on the auxiliary task reward, and determining an update to values of multiple parameters of an action selection neural network based on the overall reward using a reinforcement learning technique.

20 Claims, 3 Drawing Sheets

(58) Field of Classification Search
USPC .......................................................... 382/155
See application file for complete search history.

(56) References Cited

OTHER PUBLICATIONS

Minh et al., "Asynchronous Methods for Deep Reinforcement Learning" arXiv: 1602.01783v2, Jun. 16, 2016, 19 pages (Year: 2016).*
Notice of Allowance in Japanese Appln. No. 2023-506026, dated Jun. 17, 2024, 5 pages (with English translation).
Abdolmaleki et al., "Relative entropy regularized policy iteration," CoRR, submitted on Dec. 5, 2018, arXiv:1812.02256v1, 23 pages.
Andrychowicz et al., "Hindsight experience replay," Advances in neural information processing systems, 2017, 11 pages.
Aytar et al., "Playing hard exploration games by watching youtube," Advances in neural information processing systems, 2018, 12 pages.
Bengio et al., "Curriculum learning," in Proceedings of the 26th annual international conference on machine learning, Jun. 14, 2009, p. 41-48.
Bingham et al., "Random projection in dimensionality reduction: applications to image and text data," in Proceedings of the seventh ACM SIGKDD international conference on Knowledge discovery and data mining, Aug. 26, 2021, p. 245-250.
Burgess et al., "Monet:Unsupervised scene decomposition and representation," CoRR, submitted on Jan. 22, 2019, arXiv:1901.11390v1, 22 pages.
Byravan et al., "Imagined value gradients: Model-based policy optimization with tranferable latent dynamics models," in Conference on Robot Learning, May 12, 2020, 24 pages.
Cabi et al., "The intentional unintentional agent: Learning to solve many continuous control tasks simultaneously," in Conference on Robot Learning, Oct. 18, 2017, 10 pages.
Chen et al., "A simple framework for contrastive learning of visual representations," in International conference on machine learning, Nov. 21, 2020, p. 1597-1607.
Donahue et al., "Large scale adversarial representation learning," Advances in neural information processing systems, 2019, 11 pages.
Dosovitskiy et al., "Learning to act by predicting the future," CoRR, submitted on Feb. 14, 2017, arXiv:1611.01779v2, 14 pages.
Eysenbach et al., "Diversity is all you need: Learning skills without a reward function," CoRR, submitted on Oct. 9, 2018, arXiv:1802.06070v6, 22 pages.
Florensa et al., "Reverse curriculum generation for reinforcement learning," in Conference on robot learning, Oct. 18, 2017, p. 482-495.
Forestier et al., "Intrinsically motivated goal exploration processes with automatic curriculum learning," The Journal of Machine Learning Research, Jan. 1, 2022, 23(1):6818-58.
Graves et al., "Automated curriculum learning for neural networks," in international conference on machine learning, Jul. 17, 2017, p. 1311-1320.
Gregor et al., "Towards conceptual compression," in NeurIPS, 2016, p. 3549-3557.
Gregor et al., "Variational intrinsic control," CoRR, submitted on Nov. 22, 2016, arXiv:1611.07507v1, 15 pages.
Grill et al., "Bootstrap your own latent—a new approach to self-supervised learning," Advances in neural information processing systems, 2020, 33:21271-84.
Grimm et al., "Disentangled cumulants help successor representations transfer to new tasks," CoRR, submitted on Nov. 25, 2019, arXiv:1911.10866v1, 15 pages.
Hafner et al., "Dream to control: Learning behaviors by latent imagination," CoRR, submitted on Mar. 17, 2020, arXiv:1912.01603v3, 20 pages.
Heess et al., "Emergence oflocomotion behaviours in rich environments," CoRR, submitted on Jul. 10, 2017, arXiv:1707.02286v2, 14 pages.
Hertweck et al., "Simple Sensor Intentions for Exploration," CoRR, submitted on May 15, 2020, arXiv:2005.07541v1, 13 pages.
Higgins et al., "beta-vae: Learning basic visual concepts with a constrained variational framework," in International conference on learning representations, Nov. 4, 2016, 13 pages.
Higgins et al., "Darla: Improving zero-shot transfer in reinforcement learning," in International Conference on Machine Learning, Jul. 17, 2017, p. 1480-1490.
Hinton et al., "Reducing the dimensionality of data with neural networks," Science, Jul. 28, 2006, 313(5786):504-7.
International Preliminary Report on Patentability in Appln. No. PCT/EP2021/071078, mailed on Jan. 31, 2023, 10 pages.
International Search Report and Written Opinion in Appln. No. PCT/EP2021/071078, mailed on Nov. 19, 2021, 15 pages.
Jaderberg et al., "Reinforcement learning with unsupervised auxiliary tasks," CoRR, submitted on Nov. 16, 2016, arXiv:1611.05397v1, 14 pages.
Jeong et al., "Self-supervised sim-to-real adaptation for visual robotic manipulation," CoRR, submitted on Oct. 21, 2019, arXiv:1910.09470v1, 7 pages arXiv:1910.09470, 2019.
Kaiser et al., "Model-based reinforcement learning for atari," CoRR, submitted on Feb. 19, 2020, arXiv: 1903.00374v4, 28 pages.
Kalashnikov et al., "Qt-opt: Scalable deep reinforcement learning for vision-based robotic manipulation," CoRR, submitted on Nov. 28, 2018, arXiv:1806.10293v3, 23 pages.
Kingma et al., "Auto-encoding variational bayes," CoRR, submitted on Dec. 10, 2022, arXiv:1312.6114v11, 14 pages.
Klyubin et al., "All else being equal be empowered," in European Conference on Artificial Life, 2005, pp. 744-753.
Kulkarni et al., "Unsupervised learning of object keypoints for perception and control," in NeurIPS, 2019, p. 10723-10733.
Lange et al., "Autonomous reinforcement learning on raw visual input data in a real world application," in the 2012 international joint conference on neural networks (IJCNN), Jun. 10, 2012, 8 pages.
Laskin et al., "Curl: Contrastive unsupervised representations for reinforcement learning," in International Conference on Machine Learning, Nov. 21, 2020, p. 5639-5650.
Laversanne-Finot et al., "Curiosity driven exploration of learned disentangled goal spaces," in Conference on Robot Learning, Oct. 23, 2018, p. 487-504.
Lee et al., "Stochastic latent actor-critic: Deep reinforcement learning with a latent variable model," Advances in Neural Information Processing Systems, 2020, 33:74-52.
Lillicrap et al., "Continuous control with deep reinforcement learning," CoRR, submitted on Jul. 5, 2019, arXiv:1509.02971v6, 14 pages.
Locatello et al., "Challenging common assumptions in the unsupervised learning of disentangled representations," in international conference on machine learning, May 24, 2019, p. 4114-4124.
Mirowski et al., "Learning to navigate in complex environments," CoRR, submitted on Jan. 13, 2017, arXiv:1611.03673v3, 16 pages.
Mnih et al., "Playing atari with deep reinforcement learning," CoRR, submitted on Dec. 19, 2013, arXiv:1312.5602v1, 9 pages.
Nachum et al., "Data-efficient hierarchical reinforcement learning," Advances in neural information processing systems, 2018, 11 pages.
Nair et al., "Visual reinforcement learning with imagined goals," in NeurIPS, 2018, p. 9191-9200.
Office Action in Japanese Appln. No. 2023506026, mailed on Jan. 9, 2024, 8 pages (with English translation).
Oord et al., "Representation learning with contrastive predictive coding," CoRR, submitted on Jan. 22, 2019, arXiv:1807.03748v2, 13 pages.
Pathak et al., "Curiosity-driven exploration by self-supervised prediction," in International conference on machine learning, Jul. 17, 2017, 10 pages.
Rezende et al., "Stochastic backpropagation and approximate inference in deep generative models," in International conference on machine learning, Jun. 18, 2014, p. 1278-1286.
Riedmiller et al., "Learning by Playing—Solving Sparse Reward Tasks from Scratch," CoRR, submitted on Feb. 28, 2018, arXiv:1802.10567v1, 18 pages.

(56) References Cited

OTHER PUBLICATIONS

Schmidhuber, "Powerplay: Training an increasingly general problem solver by continually searching for the simplest still unsolvable problem," Frontiers in psychology, Jun. 7, 2013, 4:313, 14 pages.
Schwarzer et al., "Data-efficient reinforcement learning with momentum predictive representations," CoRR, submitted on Jul. 12, 2020, arXiv:2007.05929v1, 14 pages.
Sharma et al., "Dynamics-aware unsupervised discovery of skills," CoRR, submitted on Feb. 14, 2020, arXiv:1907.01657v2, 21 pages.
Smith et al., "Learning skills diverse via value-relevant features," in Conference on Lifelong Learning Agents, Nov. 28, 2022, p. 1174-1194.
Tassa et al., "Deepmind control suite," CoRR, submitted on Jan. 2, 2018, arXiv:1801.00690v1, 24 pages.
Teh et al., "Distral: Robust multitask reinforcement learning," Advances in neural information processing systems, 2017, 11 pages.
Thomas et al., "Independently controllable features," CoRR, submitted on Aug. 3, 2017, arXiv:1708.01289v1, 12 pages.
Todorov et al., "Mujoco: A physics engine for model-based control," in 2012 IEEE/RSJ international conference on intelligent robots and systems, Oct. 7, 2012, p. 5026-5033.
Wang et al., "Paired open-ended trailblazer (poet): Endlessly generating increasingly complex and diverse learning environments and their solutions," CoRR, submitted on Feb. 21, 2019, arXiv:1901.01753v3, 28 pages.
Watters et al., "Spatial broadcast decoder: A simple architecture for learning disentangled representations in vaes," CoRR, submitted on Aug. 14, 2019, arXiv:1901.07017v2, 35 pages.
Wulfmeier et al., "Regularized hierarchical policies for compositional transfer in robotics," CoRR, submitted on Jun. 27, 2019, 32 pages.
Yu et al., "Meta-world: A benchmark and evaluation for multi-task and meta reinforcement learning," in Conference on robot learning, May 12, 2020, 17 pages.
Li, "Deep Reinforcement Learning," cs.LG, Oct. 15, 2018, arXiv:1810.06339v1, 150 pages.
Office Action in European Appln. No. 21751552.7, mailed on Jul. 29, 2025, 10 pages.

* cited by examiner

TRAINING ACTION SELECTION NEURAL NETWORKS USING AUXILIARY TASKS OF CONTROLLING OBSERVATION EMBEDDINGS

CROSS-REFERENCE TO RELATED APPLICATIONS

This application is a National Stage Application under 35 U.S.C. § 371 and claims the benefit of International Application No. PCT/EP2021/071078, filed Jul. 27, 2021, which claims the benefit of the filing date of U.S. Provisional Patent Application Ser. No. 63/057,795 for "TRAINING ACTION SELECTION NEURAL NETWORKS USING AUXILIARY TASKS OF CONTROLLING OBSERVATION EMBEDDINGS," which was filed on Jul. 28, 2020, and which is incorporated here by reference in its entirety.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification generally describes a system implemented as computer programs on one or more computers in one or more locations for training an action selection neural network having multiple parameters that is used to control an agent interacting with an environment. The action selection neural network can be configured to process an input comprising an embedding of an observation characterizing a state of the environment to generate an action selection output that comprises a respective action score for each action in a set of possible actions that can be performed by the agent.

Throughout this specification, an "embedding" of an entity (e.g., an observation of an environment) can refer to a representation of the entity as an ordered collection of numerical values, e.g., a vector or matrix of numerical values. An embedding of an entity can be generated, e.g., as the output of a neural network that processes data characterizing the entity.

According to a first aspect, there is provided a method for training an action selection neural network having a plurality of parameters that is used to select actions to be performed by an agent interacting with an environment, wherein the action selection neural network is configured to process an input comprising an observation characterizing a state of the environment to generate an action selection output that comprises a respective action score for each action in a set of possible actions that can be performed by the agent, and select the action to be performed by the agent from the set of possible actions based on the action scores. The method includes obtaining an observation characterizing a state of the environment at a time step, processing the observation using an embedding model to generate a lower-dimensional embedding of the observation, wherein the lower-dimensional embedding of the observation has a plurality of dimensions, determining an auxiliary task reward for the time step based on a value of a particular dimension of the embedding, wherein the auxiliary task reward corresponds to an auxiliary task of controlling the value of the particular dimension of the embedding, determining an overall reward for the time step based at least in part on the auxiliary task reward for the time step, and determining an update to values of the plurality of parameters of the action selection neural network based on the overall reward for the time step using a reinforcement learning technique.

In some implementations, the auxiliary task of controlling the value of the particular dimension of the embedding comprises maximizing or minimizing the value of the particular dimension of the embedding.

In some implementations, determining the auxiliary task reward for the time step comprises determining a maximum value of the particular dimension of embeddings of respective observations characterizing the state of the environment at each of a plurality of time steps, determining a minimum value of the particular dimension of embeddings of respective observations characterizing the state of the environment at each of the plurality of time steps, and determining the auxiliary task reward for the time step based on: (i) the value of the particular dimension of the embedding at the time step, (ii) the maximum value corresponding to the particular dimension of the embedding, and (iii) the minimum value corresponding to the particular dimension of the embedding.

In some implementations, determining the auxiliary task reward for the time step comprises determining a ratio of: (i) a difference between the maximum value corresponding to the particular dimension of the embedding and the value of the particular dimension of the embedding at the time step, and (ii) a difference between the maximum value and the minimum value corresponding to the particular dimension of the embedding.

In some implementations, determining the auxiliary task reward for the time step comprises determining a ratio of: (i) a difference between the value of the particular dimension of the embedding at the time step and the minimum value corresponding to the particular dimension of the embedding, and (ii) a difference between the maximum value and the minimum value corresponding to the particular dimension of the embedding.

In some implementations, the method further includes selecting the auxiliary task of controlling the value of the particular dimension of the embedding from a set of possible auxiliary tasks in accordance with a task selection policy, wherein each possible auxiliary task corresponds to controlling a value of a respective dimension of the embedding.

In some implementations, the reinforcement learning technique is an off-policy reinforcement learning technique.

In some implementations, the embedding model comprises a random matrix, and processing the observation using the embedding model comprises: applying the random matrix to a vector representation of the observation to generate a projection of the observation, and applying a non-linear activation function to the projection of the observation.

In some implementations, the method further includes generating the vector representation of the observation by flattening the observation into a vector.

In some implementations, the embedding model comprises an embedding neural network.

In some implementations, the embedding neural network comprises an encoder neural network of an auto-encoder neural network.

In some implementations, the auto-encoder neural network is a variational auto-encoder (VAE) neural network.

In some implementations, the variational auto-encoder neural network is a β-variational auto-encoder (β-VAE) neural network.

In some implementations, processing the observation using the embedding model to generate the lower-dimensional embedding of the observation comprises: processing the observation using the encoder neural network to generate parameters defining a probability distribution over a latent space, and determining the lower-dimensional embedding of the observation based on a mean of the probability distribution over the latent space.

In some implementations, the observation comprises an image and the lower-dimensional embedding of the observation comprises respective coordinates for each of a plurality of key points in the image.

In some implementations, the observation comprises an image and the lower-dimensional embedding of the observation comprises a set of statistics characterizing a spatial color distribution in the image.

In some implementations, the method further includes determining a main task reward for the time step that corresponds to a main task being performed by the agent in the environment, and determining the overall reward for the time step based on the auxiliary task reward for the time step and the main task reward for the time step.

In some implementations, the agent is a mechanical agent interacting with a real-world environment, and the main task being performed by the agent comprises physically manipulating objects in the environment.

In some implementations, the observation comprises an image, and wherein processing the observation using the embedding model to generate the lower-dimensional embedding of the observation comprises: processing the image to generate a set of multiple attention masks, wherein each attention mask defines a respective region of the image and the attention masks jointly define a partition of the image, generating a respective embedding for each attention mask by processing: (i) the attention mask, and (ii) the image, using the encoder neural network of the auto-encoder neural network, and determining the lower-dimensional embedding of the observation based on a combination of the respective embedding for each attention mask.

According to a second aspect, there is provided a system including: one or more computers; and one or more storage devices communicatively coupled to the one or more computers, where the one or more storage devices store instructions that, when executed by the one or more computers, cause the one or more computers to perform the operations of the respective method of any preceding aspect.

According to a third aspect, there are provided one or more non-transitory computer storage media storing instructions that when executed by one or more computers cause the one or more computers to perform the operations of the respective method of any preceding aspect.

Particular embodiments of the subject matter described in this specification can be implemented so as to realize one or more of the following advantages.

The system described in this specification can train an action selection neural network that is used to control an agent interacting with an environment using auxiliary task rewards from one or more auxiliary tasks. Each auxiliary task can correspond to controlling (e.g., maximizing or minimizing) the value of a respective dimension of embeddings of observations of the environment that are generated using an embedding model. Training the action selection neural network using the auxiliary task rewards can encourage the agent to efficiently explore the environment and can thereby accelerate the training of the agent to perform a "main" (e.g., primary) task, e.g., physically manipulating objects in the environment. In particular, using the auxiliary task rewards can enable the agent to achieve an acceptable level of performance on the main task over fewer training iterations and using less training data than would otherwise be required, and can therefore reduce consumption of computational resources during training. Computational resources can include, e.g., memory and computing power.

The system described in this specification can be used to accelerate training of an action selection neural network used to control a robot, or other mechanical agent. For example, the system can train the action selection neural network on simulated data, e.g., characterizing interaction of a simulated robot with a simulated environment. The system can accelerate training of the action selection neural network on the simulated data by encouraging the robot to efficiently explore its simulated environment by learning to perform auxiliary tasks, e.g., of controlling dimensions of embeddings of simulated observations. After being trained on simulated data, the trained action selection neural network can be deployed to control a real-world robot to efficiently perform tasks in real-world environments. Thus, a method is provided for selecting actions to be performed by an agent interacting with a real-world environment, comprising a first phase of performing a method for training an action selection neural network having a plurality of parameters based on observations of a simulated (or real-world) environment, followed by a second phase of one or more steps of using the trained action selection network to select actions for the agent to perform when interacting with a real environment based on observations of the real-world environment. In each phase, observations of the real-world environment are obtained by sensors (e.g. cameras) sensing the real-world environment.

The system described in this specification can train an action selection neural network using auxiliary tasks which can require minimal manual design effort. In particular, rather than requiring that the auxiliary tasks be manually designed by an expert (which can be difficult and time consuming), a user of the system only needs to specify the embedding model that is used to generate the observation embeddings. A large number of conventional embedding models, e.g., variational auto-encoders, are readily available without manual design effort.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
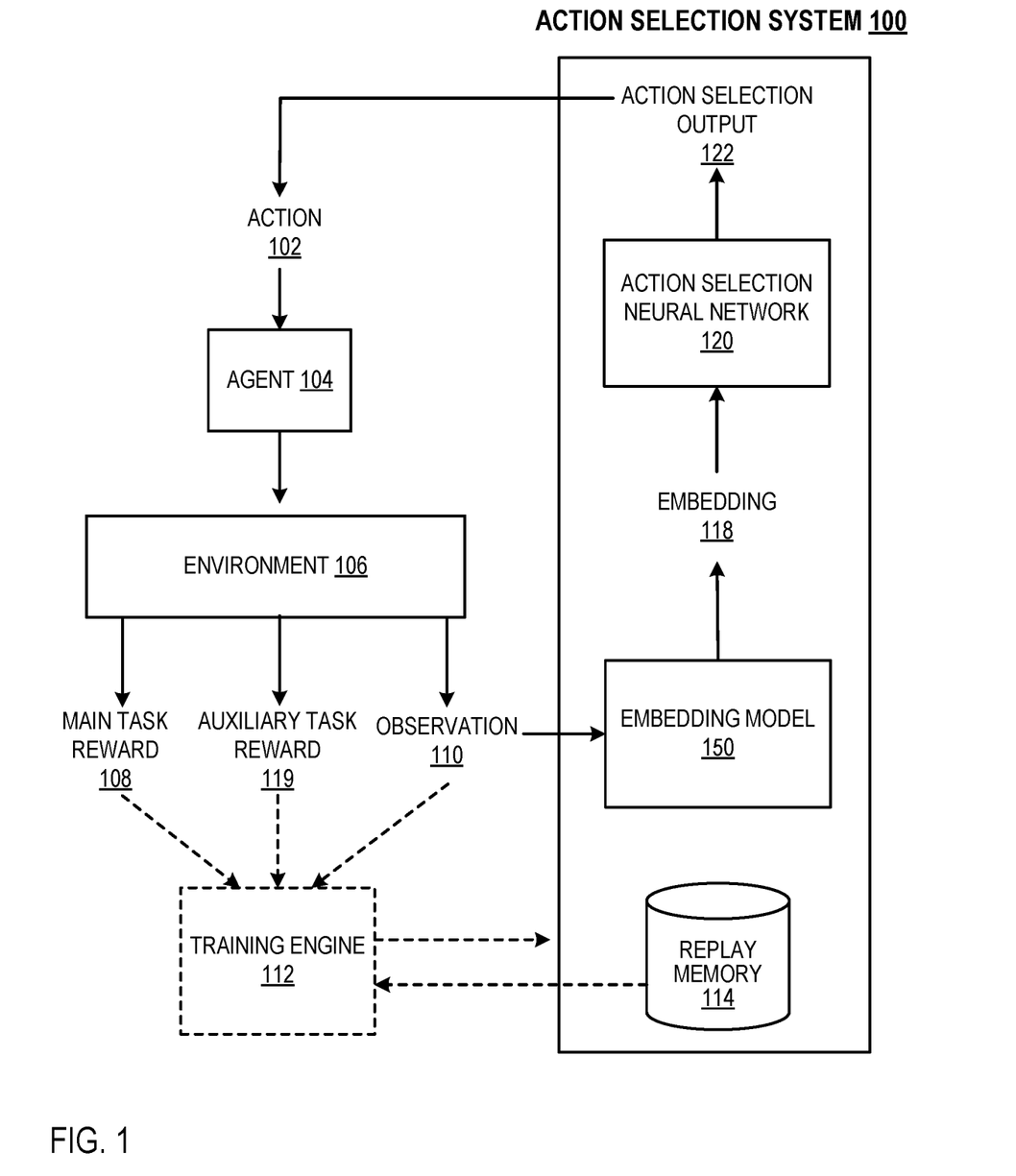
FIG. 1 is a block diagram of an example action selection system including an action selection neural network.

FIG. 1 shows an example action selection system 100 that can control an agent 104 interacting with an environment 106. The action selection system 100 is an example of a system implemented as computer programs on one or more computers in one or more locations in which the systems, components, and techniques described below are implemented.

The system 100 selects actions 102 to be performed by the agent 104 interacting with the environment 106 at each of multiple time steps to accomplish a goal (also referred to as a "main" task). At each time step, the system 100 receives data characterizing the current state of the environment 106 and selects an action 102 to be performed by the agent 104 in response to the received data. Data characterizing a state of the environment 106 will be referred to in this specification as an observation 110 and can include, e.g., an image, or any other appropriate data. In some cases, the agent 104 can be, e.g., a robot, and the observation 110 can include, e.g., joint positions, velocities and torques, or any other appropriate data, as will be described in more detail below. At each time step, the state of the environment 106 at the time step (as characterized by the observation 110) depends on the state of the environment 106 at the previous time step and the action 102 performed by the agent 104 at the previous time step.

At each time step, the system 100 can receive a main task reward 108 based on the current state of the environment 106 and the action 102 of the agent 104 at the time step. Generally, the main task reward 108 can be represented as a numerical value. The main task reward 108 can be based on any event in or aspect of the environment 106. For example, the main task reward 108 can indicate whether the agent 104 has accomplished a main task (e.g., physically manipulating objects in the environment in a desired way) or the progress of the agent 104 towards accomplishing a main task. After the system 100 selects the action 102 to be performed by the agent 104 at the time step, the agent 104 interacts with the environment 106 by performing the action 102, and the system 100 can receive a main task reward 108 based on the interaction.

In some cases, the action selection system 100 can receive a non-zero main task reward 108 only when the agent 104 has successfully accomplished a main task, or the instance of receipt of non-zero main task rewards 108 can otherwise be relatively rare when compared to the number of actions 102 performed by the agent 104 during the course of training. In other words, the agent 104 can be required to perform multiple actions 102 before it is able to receive any feedback, e.g., in the form of non-zero main task rewards, on its performance on the main task from the environment 106. For example, if the agent 104 is a physical robotic arm, and the main task is to pick up a physical object, the robotic arm can be required to firstly successfully perform intermediate tasks, such as reaching and gripping the object, before it is able to successfully lift the object (e.g., to successfully perform the main task). In the absence of any intermediate feedback from the environment 106 (e.g., in the form of non-zero main task rewards), training the agent 104 to perform the main task can take a considerable amount of time.

Accordingly, at each time step, in addition to receiving the main task reward 108 based on the interaction of the agent 104 with the environment 106, the system 100 can receive (e.g., generate) one or more auxiliary task rewards 119 that can characterize a performance of the agent 104 at performing one or more auxiliary (e.g., intrinsic, or intermediate) tasks. Appropriately defined auxiliary tasks can facilitate exploration and improve the agent's 104 performance on the main task. Auxiliary tasks can be determined by a human expert, which can require a considerable amount of design effort, especially in the domain of robotic systems. However, by utilizing an embedding model 150 as part of the action selection system 100, appropriate auxiliary tasks, and associated auxiliary task rewards 119, can be determined automatically, as will be described in more detail next.

The auxiliary tasks can be determined based on the observation 110 characterizing the current state of the environment 106. Specifically, at each time step, the observation 110 can be processed by the embedding model 150 to generate a lower-dimensional embedding 118 having a particular number of dimensions (e.g., 2, 16, 32, or 100 dimensions) and the auxiliary task can correspond to controlling the value of at least one particular dimension of the embedding. Generally, an "embedding" refers to an ordered collection of numerical values, such as a vector or matrix of numerical values, and "lower-dimensional" indicates that the embedding 118 has a smaller number of dimensions than the observation 110.

The embedding model 150 can generate a "compressed" structured representation of the observation 110 that can be more efficiently processed by the action selection neural network 120. In some implementations, the system 100 can use multiple embedding models 150, and provide each respective lower-dimensional embedding 118, generated by each of the embedding models 150, to the action selection neural network 120. The system 100 can use the same type of embedding model 150, or different types of embedding models 150, to generate the lower-dimensional embeddings 118.

By way of example, at each time step, the embedding model 150 can process a high-dimensional observation 110 (e.g., an image having dimensions of 64 by 64 pixels) to generate an embedding 118 representing, e.g., respective values of x and y coordinates (e.g., in a frame of reference of the image) of each of multiple key points in the image. Generally, a "key point" refers to a location (e.g., represented by spatial two-dimensional coordinates) in the image that is predicted to have a desired property, e.g., key points in the image can be located on one or multiple objects, parts of objects, and/or independently moving entities in the environment.

In this example, a first auxiliary task can be, e.g., controlling the value of the x-coordinate of the embedding, and a second auxiliary task can be, e.g., controlling the value of the y-coordinate of the embedding, for each of the key points in the set of key points. Accordingly, at each time step, in addition to progressing toward solving a main task (which may or may not lead to the system receiving a main task reward 108 at the time step), the agent 104 can progress toward solving one or both auxiliary tasks and the system 100 can receive respective auxiliary task rewards 119 characterizing a performance of the agent 104 at the auxiliary tasks. The above example is provided for illustrative purposes only, and the number of dimensions of the embedding, and the corresponding number of auxiliary tasks and auxiliary task rewards 119, can depend on a particular type of embedding model 150, as will be described in more detail below with reference to FIG. 2.

Each auxiliary task of controlling the value of the particular dimension of the embedding can include, e.g., maximizing or minimizing the value of the particular dimension of the embedding. For example, if x is the observation 110 received at the time step, and $z_i(x)$ represents the value of the particular dimension i of the embedding z generated by the embedding model 150, the auxiliary tasks can be, for each dimension i of the embedding, maximizing the value of the embedding $\max_x(z_i(x))$ or minimizing the value of the embedding $\min_x(z_i(x))$.

At each time step, the system 100 can determine the auxiliary task reward 119, associated with each auxiliary task, based on (i) the value of the particular dimension of the embedding $z_i(x)$ at the time step, (ii) a maximum value of the particular dimension of the embedding $\max_x(z_i(x))$, and (iii) a minimum value of the particular dimension of the embedding $\min_x(z_i(x))$. For example, given the observation x received at the time step, and the action a performed by the agent at the time step, the auxiliary task reward $r_i$ for the dimension i of the embedding z associated with each of the max and min auxiliary tasks, respectively, can be either of:

$$r_{i,max}(x, a) = 1 - \frac{\max_x(z_i(x)) - z_i(x)}{\text{range}(z_i)} \quad (1)$$

$$r_{i,min}(x, a) = 1 - \frac{z_i(x) - \min_x(z_i(x))}{\text{range}(z_i)} \quad (2)$$

where $\text{range}(z_i)$ is a normalization factor that denotes the difference between the maximum value $\max_x(z_i(x))$ of a particular dimension i of the embedding $z_i(x)$, and the minimum value $\min_x(z_i(x))$ of the particular dimension i of the embedding $z_i(x)$.

In one example, the maximum and the minimum values of a particular dimension of the embedding can be determined over a particular window (e.g., number, or range) of observations received over previous time steps during training of the action selection system 100. In another example, the maximum and the minimum values of a particular dimension of the embedding can be determined over a training dataset of observations and embeddings generated as a result of pre-training the embedding model 150, e.g., as a result of training the embedding model 150 prior to, and independently of, training the action selection system 100.

In some implementations, the auxiliary task of controlling the value of a particular dimension of the embedding can include steering the value of the particular dimension of the embedding towards a target value. The target value can be, e.g., randomly selected, or specified by a user of the system, and can, e.g., change over time.

As described above, at each time step, the system 100 can receive a main task reward 108, characterizing the progress of the agent 104 towards achieving a main goal, and additionally receive one or more auxiliary task rewards 119, characterizing a performance of the agent 104 at the one or more auxiliary tasks. At each time step, the action selection system 100 can further determine an overall reward based at least in part on the one or more auxiliary task rewards 119. The overall reward for the time step can be, e.g., a linear combination of the main task reward and one or more auxiliary task rewards 119.

In some implementations, the action selection neural network 120 can include one or more "shared" neural network layers, followed by: (i) a "head" corresponding to the main task, and (ii) a respective "head" corresponding to each auxiliary task. (A "head" refers to a set of one or more neural network layers, e.g., a sequence of fully-connected neural network layers, or any other appropriate neural network layers). The shared neural network layers are configured to process the action selection neural network input to generate a shared representation of the action selection neural network input, i.e., that is shared between all the heads. The head corresponding to the main task is configured to process the shared representation to generate an action selection output used to select actions for performing the main task. The respective head corresponding to each auxiliary task is configured to process the shared representation to generate an action selection output used to select actions for performing the auxiliary task.

The system can train the "main task head" of the action selection neural network corresponding to the main task using the main task rewards, i.e., by backpropagating gradients of a reinforcement learning objective based on the main task rewards through the main task head and into the shared neural network layers. The system can similarly train each "auxiliary task head" of the action selection neural network corresponding to each auxiliary task using the corresponding auxiliary task rewards, i.e., by backpropagating gradients of a reinforcement learning objective function based on the auxiliary task reward through the auxiliary task head and into the shared neural network layers. The system can thus train the shared neural network layers of the action selection neural network to generate effective and informative representations for action selection using both the main task reward and the auxiliary task rewards.

In some implementations, the system 100 can select a particular auxiliary task from a set of possible auxiliary tasks according to a task selection policy. The task selection policy can optimize the choice of auxiliary tasks so as to maximize the agent's 104 performance on the main task. The task selection policy can be used to select a new auxiliary task, e.g., after each time the agent interacts with the environment over a predetermined number of time steps, or each time the agent accomplishes a goal (e.g., a main task). After "selecting" a particular auxiliary task, the particular auxiliary task is used to train the action selection neural network 120 on the auxiliary task reward 119 associated with that auxiliary task.

The task selection policy can have two phases. In the first phase, e.g., before any non-zero main task rewards have been received, the system 100 can sample an auxiliary task from a set of possible auxiliary tasks to be a "replacement" main task. The system 100 can exclude certain auxiliary tasks from consideration as the replacement main task, e.g., the system can exclude auxiliary tasks for which only zero-valued rewards have previously been received, or for which a high reward (e.g., that exceeds a predefined threshold) is already achieved at an initial state of the environment. The system samples the replacement main task in accordance with a probability distribution (e.g., a uniform distribution) over the remaining candidate set of auxiliary tasks (i.e., that have not been excluded from consideration as the replacement main task). After the replacement main task is selected, the system can select tasks in accordance with a probability distribution over the set of possible tasks (i.e., including the main task and each auxiliary task). The system can determine a respective score for each task in the set of possible tasks as the average reward (e.g., computed along trajectories stored in the replay memory) received for the replacement main task when selecting actions using the action selection neural network head corresponding to the task. The system can then determine the probability distribution over the set of possible tasks using the scores, e.g., by processing the scores using a soft-max function. Thus, in some implementations, in the first phase the system 100 can select tasks so as to accelerate learning of the replacement main task.

In the second phase, e.g., after non-zero main task rewards have been received at one or more time steps, the system 100 can select tasks so as to accelerate learning of the main task (e.g., instead of accelerating learning of the replacement main task). For example, the system can determine a score for each auxiliary task as the average reward (e.g., computed along trajectories in the replay memory) received for the main task when selecting actions using the action selection neural network head corresponding to the auxiliary task. The system can then determine the probability distribution over the auxiliary tasks using the scores, e.g., by processing the scores using a soft-max function. Thus, in some implementations, in the second phase the system 100 can select tasks so as to accelerate learning of the main task.

At each time step, the action selection neural network 120 can process the embedding 118 to generate an action selection output 122 that can include a respective score for each action in a set of possible actions that can be performed by the agent 104. The system 100 selects the action 102 to be performed by the agent 104 at the time step using the action selection output 122 generated by the action selection neural network 120 at the time step. For example, the system 100 can select the action having the highest score, according to the action selection output 122, as the action 102 to be performed by the agent at the time step.

In some implementations, the system 100 selects the action 102 to be performed by the agent in accordance with an exploration strategy. For example, the system 100 can use an ∈-greedy exploration strategy. In this example, the system 100 can select the action having a highest score (according to the action selection output 122) with probability 1−∈, and select an action randomly with probability ∈, where ∈ is a number between 0 and 1.

The action selection neural network 120 can have any appropriate neural network architecture that enables it to perform its described function. For example, the action selection neural network can include any appropriate neural network layers (e.g., convolutional layers, fully connected layers, recurrent layers, attention layers, etc.) connected in any appropriate configuration (e.g., as a linear sequence of layers).

A training engine 112 can use the observations 110 and corresponding overall rewards to train the action selection system 100 using reinforcement learning techniques. The training engine 112 trains the action selection system 100 by iteratively adjusting the parameters of the action selection neural network 120 and, optionally, the parameters of the embedding model 150. The training engine 112 can adjust the parameters of the action selection system 100 by iteratively backpropagating gradients of a reinforcement learning objective function (e.g., a Q learning objective function, a policy gradient objective function, or any other appropriate reinforcement learning objective function) through the action selection system 100. By training the action selection system 100, the training engine 112 can cause the action selection system 100 to select actions that increase a cumulative measure of the overall reward (e.g., a long-term time-discounted cumulative overall reward) received by the action selection system 100 and cause the agent 104 to accomplish its main goal more effectively (e.g., over fewer time steps).

The action selection system 100 can further include a replay memory 114 implemented as, e.g., as a logical data storage area or physical data storage device. The memory 114 can store a respective "experience tuple" corresponding to each of multiple previous time steps (e.g., the memory 114 can store a respective experience tuple for each time step before the current time step). An experience tuple for a time step refers to data that characterizes the interaction of the agent 104 with the environment 106 at a previous time step.

For example, an experience tuple for a previous time step can include respective embeddings (representations) of: (i) the observation 110 at the previous time step, (ii) the action 102 performed by the agent 104 at the previous time step, (iii) the subsequent observation that resulted from the action performed by the agent at the previous time step, and (iv) the overall reward (that can include, e.g., a main task reward 108 and one or more auxiliary task rewards 119) at the previous time step.

In some implementations, the training engine 112 can train the action selection neural network 120 on the experience tuples stored in the replay memory 114 using an off-policy reinforcement learning technique. That is, the action selection neural network 120 is trained at any given current time step based on a plurality of experience tuples relating to corresponding time steps when the parameters of the action selection neural network 120 were different from their values at the current time step. These corresponding time steps may comprise previous time steps in a sequence of time steps which led to the current state of the environment; and/or time steps during previous sessions (sequences of time steps) of interaction with the environment, e.g. starting from different initial states of the environment. Example off-policy reinforcement learning techniques are described with reference to: Abdolmaleki, Abbas et al., "Relative entropy regularized policy iteration," arXiv preprint arXiv:1812.02256 (2018).

Examples of possible agents, environments, and main tasks, will be described in more detail next.

In some implementations, the environment 106 is a real-world environment and the agent is a mechanical agent interacting with the real-world environment, e.g. moving within the real-world environment (by translation and/or rotation in the environment, and/or changing its configuration) and/or modifying the real-world environment. For example, the agent can be a robot interacting with the environment, e.g., to perform a main task of locating an object of interest in the environment, moving an object of interest to a specified location in the environment, physically manipulating an object of interest in the environment in a specified way, or navigating to a specified destination in the environment; or the agent can be an autonomous or semi-autonomous land, air, or sea vehicle performing a main task of navigating through the environment to a specified destination in the environment.

In these implementations, the observations 110 can include, for example, one or more of images, object position data, and sensor data to capture observations as the agent interacts with the environment 106, for example sensor data from an image, distance, or position sensor or from an actuator.

For example in the case of a robot the observations 110 can include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations 110 can similarly include one or more of the position, linear or angular velocity, force, torque or acceleration, and global or relative pose of one or more parts of the agent. The observations 110 can be defined in 1, 2 or 3 dimensions, and can be absolute and/or relative observations.

The observations 110 can also include, for example, data obtained by one of more sensor devices which sense a real-world environment; for example, sensed electronic signals such as motor current or a temperature signal; and/or image or video data for example from a camera or a LIDAR sensor, e.g., data from sensors of the agent or data from sensors that are located separately from the agent in the environment 106.

In the case of an electronic agent the observations 110 may include data from one or more sensors monitoring part of a plant or service facility such as current, voltage, power, temperature and other sensors and/or electronic signals representing the functioning of electronic and/or mechanical items of equipment.

The actions 102 can be control inputs to control a robot or other mechanical agent, e.g., torques for the joints of the robot or higher-level control commands, or the autonomous or semi-autonomous land or air or sea vehicle, e.g., torques to the control surface or other control elements of the vehicle or higher-level control commands. Thus, the observation may relate to a real-world environment and the selected action may relate to an action to be performed by a mechanical agent. The action selection neural network 120 is used to control the mechanical agent to perform the task while interacting with the real-world environment by obtaining the observations from one or more sensors sensing the real-world environment and using the policy output to select actions to control the mechanical agent, e.g. to perform the main task.

In other words, the actions can include for example, position, velocity, or force/torque/acceleration data for one or more joints of a robot or parts of another mechanical agent. Actions can additionally or alternatively include electronic control data such as motor control data, or more generally data for controlling one or more electronic devices within the environment 106 the control of which has an effect on the observed state of the environment 106. For example in the case of an autonomous or semi-autonomous land, air, or sea vehicle the actions can include actions to control navigation e.g. steering, and movement e.g., braking and/or acceleration of the vehicle.

In some implementations the environment 106 is a simulated environment 106 and the agent is implemented as one or more computers interacting with the simulated environment 106.

For example the simulated environment 106 can be a simulation of a robot or vehicle and the action selection network can be trained on the simulation. For example, the simulated environment 106 can be a motion simulation environment 106, e.g., a driving simulation or a flight simulation, and the agent can be a simulated vehicle performing a main task of navigating through the motion simulation. In these implementations, the actions can be control inputs to control the simulated user or simulated vehicle.

In another example, the simulated environment 106 can be a video game and the agent can be a simulated user playing the video game.

In a further example the simulated environment 106 may be a protein folding environment 106 such that each state is a respective state of a protein chain and the agent is a computer system for determining how to fold the protein chain. In this example, the actions are possible folding actions for folding the protein chain and the goal to be achieved may include, e.g., folding the protein so that the protein is stable and so that it achieves a particular biological function.

Generally in the case of a simulated environment 106 the observations can include simulated versions of one or more of the previously described observations or types of observations and the actions can include simulated versions of one or more of the previously described actions or types of actions.

In some cases, the action selection system 100 can be used to control the interactions of the agent 104 with a simulated environment 106, and a training engine can train the parameters of the action selection system (e.g., using reinforcement learning techniques) based on the interactions of the agent 104 with the simulated environment 106. After the action selection system 100 is trained based on the interactions of the agent 104 with a simulated environment 106, the agent 104 can be deployed in a real-world environment, and the trained action selection system can be used to control the interactions of the agent 104 with the real-world environment. Training the action selection system based on interactions of the agent 104 with a simulated environment 106 (i.e., instead of a real-world environment) can avoid wear-and-tear on the agent 104 and can reduce the likelihood that, by performing poorly chosen actions, the agent 104 can damage itself or aspects of its environment 106.

In some other applications the agent 104 may control actions in a real-world environment including items of equipment, for example in a data center or grid mains power or water distribution system, or in a manufacturing plant or service facility. The observations may then relate to operation of the plant or facility. For example the observations may include observations of power or water usage by equipment, or observations of power generation or distribution control, or observations of usage of a resource or of waste production. The agent 104 may control actions in the environment 106 to accomplish the goal of increased efficiency, for example by reducing resource usage, and/or reduce the environmental impact of operations in the environment 106, for example by reducing waste. The actions may include actions controlling or imposing operating conditions on items of equipment of the plant/facility, and/or actions that result in changes to settings in the operation of the plant/facility e.g. to adjust or turn on/off components of the plant/facility.

In some further applications, the environment 106 is a real-world environment and the agent 104 manages distribution of tasks across computing resources e.g. on a mobile device and/or in a data center. In these implementations, the actions may include assigning tasks to particular computing resources, and the goal to be achieved can include minimizing the time required to complete a set of tasks using specified computing resources.

As a further example, the actions may include presenting advertisements, the observations may include advertisement impressions or a click-through count or rate, and the reward may characterize previous selections of items or content taken by one or more users. In this example, the goal to be achieved can include maximizing selections of item or content by the one or more users.

Optionally, in any of the above implementations, the observation at any given time step can include data from a previous time step that can be beneficial in characterizing the environment, e.g., the action performed at the previous time step, the reward received at the previous time step, and so on.

Example embedding models 150 that can be used as part of the action selection system 100 to process the observation 110 and generate the lower-dimensional embedding 118 will be described in more detail next.

Figure 2:
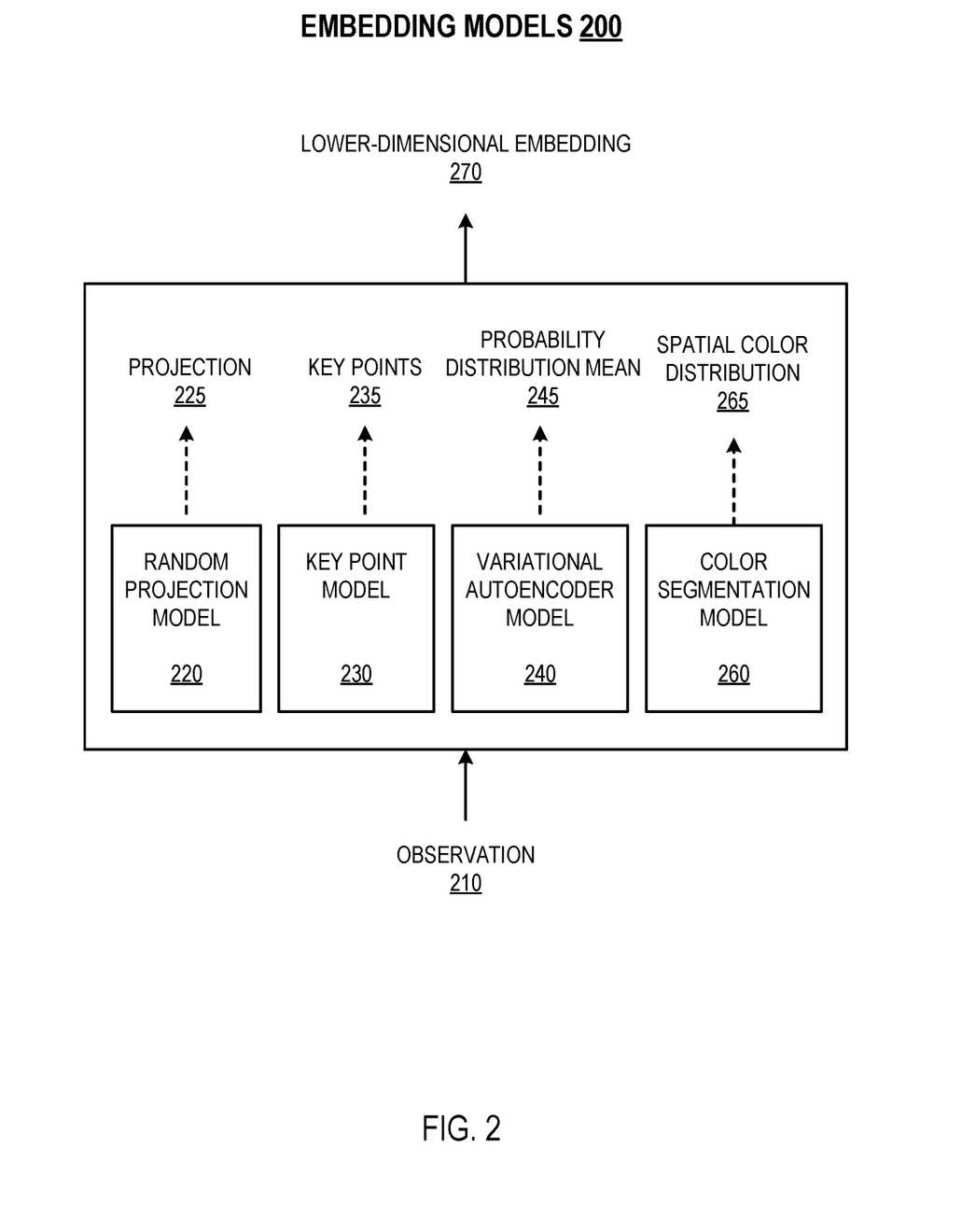
FIG. 2 is a block diagram of example embedding models.

FIG. 2 is a block diagram of example embedding models 200 that can be included in the action selection system 100 described with reference to FIG. 1. The embedding models are examples of systems implemented as computer programs on one or more computers in one or more locations in which the systems, components, and techniques described below are implemented.

Each embedding model is configured to process an observation 210 (e.g., the observation 110 in FIG. 1) characterizing the current state of an environment (e.g., the environment 106 in FIG. 1) to generate a lower-dimensional embedding 270 of the observation 210. As described above, at each time step, an action selection system can receive an one or more auxiliary task rewards that each correspond to controlling a value of a particular dimension of the lower-dimensional embedding 270 generated by one or more of the example embedding models 200. Example embedding models 200 can include a random projection model 220, a key point model 230, a variational autoencoder model 240, and a color segmentation model 260, each of which will be described in more detail below. The embedding models 200 are provided for illustrative purposes only, and other types of embedding models 200 can be used to generate the lower-dimensional embedding 270 of the observation 210. In some forms of the system of FIG. 1, only one of the embedding models 220, 230, 240, 260 is provided as the embedding model 150. In other forms of the system of FIG. 1, multiple ones of the embedding models 220, 230, 240, 260 are provided in the action selection system 100, and at different times a corresponding different one of the multiple embedding models 220, 230 240, 260 is used as the embedding model 150 of FIG. 1 as described below.

The random projection model 220 can be configured to project a high-dimensional input onto a lower-dimensional subspace and thereby generate the lower-dimensional embedding 270. Specifically, the model 220 can process the observation (e.g., an image) by applying a random matrix to a vector representation of the image (e.g., obtained by flattening the image into a vector) to generate a projection of the image. The random matrix can include multiple entries, where each entry is sampled from a probability distribution, e.g., a standard Normal distribution. Generally, an image can be represented, e.g., as an array of "pixels," where each pixel is associated with a respective spatial location in the image and corresponds to a respective vector of one or more numerical values representing image data at the spatial location. For example, a 2D RGB image can be represented by a 2D array of pixels, where each pixel is associated with a respective 3D vector of values representing the intensity of red, green, and blue color at the spatial location corresponding to the pixel in the image.

The random matrix M used by the random projection model 220 can have dimensions of (d, h×w×3), where h is the height of the image, w is the width of the image, and d is the embedding size, and the factor of 3 is present only in the case that each pixel of the image has a corresponding number of color intensity values (i.e. RGB). After applying the random matrix M to the vector representation of the image, the random projection model 220 can apply a non-linear activation function, e.g., a hyperbolic tangent function tan h, to the projection. The resultant embedding z can be represented as:

$$z = \tan h(M \times \text{flatten}(I)) \quad (3)$$

where M is the random matrix, I is the image, and flatten(I) is the vector representation of the image. Example random projection models are described with reference to: Bingham, E., and Mannila, H.: "Random projection in dimensionality reduction: applications to image and text data," Proceedings of the Seventh ACM SIGKDD International Conference on Knowledge Discovery and Data Mining, pp. 245-250. 2001.

The key point model 230 can be configured to process the observation 210 that includes an image to generate a lower-dimensional embedding 270 that includes respective coordinates for each of multiple key points 235 in the image. As described above, a "key point" generally refers to a location (e.g., spatial two-dimensional coordinates) in the image that is predicted to have certain desired properties. For example, key points in the image can be located on, e.g., one or multiple objects, parts of objects, and/or independently moving entities in the environment. For example, the key point model 230 can process the image and generate a lower-dimensional embedding having dimensions K×2, where K represents a number of objects in the image and can be specified manually, e.g., by a user of the system.

The key point model 230 can be implemented as a neural network having a neural network architecture that enables it to perform the described function and can be trained using, e.g., supervised learning or reinforcement learning techniques. In some implementations, the key point model 230 can be trained independently of the action selection neural network. Examples of key point models are described with reference to: T. D. Kulkarni, A. Gupta, C. Ionescu, S. Borgeaud, M. Reynolds, A. Zisserman, and V. Mnih, "Unsupervised learning of object keypoints for perception and control," in NeurIPS, 2019, pp. 10 723-10 733.

The variational autoencoder model 240 can be configured to process the observation 210 (e.g., an image) to generate parameters defining a probability distribution over a latent space, and determine the lower-dimensional embedding 270 based on a mean of the probability distribution 245 over the latent space. Generally, a variational autoencoder can be implemented as a neural network architecture that includes an encoder neural network and a decoder neural network. The encoder neural network can process the observation 210 to generate a set of parameters defining a distribution over a space of latent variables, e.g., defining the mean and variance of a multivariate Gaussian distribution over d-dimensional Euclidean space. The decoder neural network can sample a latent from the probability distribution over the latent space, and process the sampled latent to reconstruct the observation 210.

The lower-dimensional embedding generated by the variational autoencoder model 240 can be, e.g., the mean of the distribution generated by the encoder neural network by processing the observation. In some implementations, the variational autoencoder model 240 can be trained independently of the action selection neural network. Example variational autoencoder architectures are described with reference to: Higgins, Irina, et al., "beta-VAE: Learning basic visual concepts with a constrained variational framework," (2016) and Burgess, Christopher P., et al., "Monet: Unsupervised scene decomposition and representation," arXiv preprint arXiv:1901.11390 (2019).

In some implementations, as part of generating an embedding of an observation represented as an image using the variational autoencoder model 240, the system can process the image to generate a set of multiple attention masks. Each attention mask defines a respective region of the image, and the attention masks jointly define a partition of the image, i.e., such that each pixel in the image is included in a corresponding region defined by exactly one attention mask. Each attention mask is predicted to define a semantically meaningful region of the image, e.g., a region of the image corresponding to a respective object, or a region of the image corresponding to the background. In these implementations, the variational autoencoder model can be configured to generate a respective embedding (as described above) corresponding to each attention mask by processing an input including both: (i) the attention mask, and (ii) the image. The system can then define the overall embedding of the image as the combination (e.g., concatenation) of the respective embeddings generated for each attention mask. Example techniques for jointly training a segmentation neural network and a variational autoencoder are described in more detail with reference to: Burgess, Christopher P., et al., "Monet: Unsupervised Scene Decomposition and Representation," arXiv preprint arXiv: 1901.11390 (2019).

The color segmentation model 260 is configured to process the observation 210 (e.g., an image) to generate the lower-dimensional embedding 270 including a set of statistics characterizing a spatial color distribution 265 in the image. The spatial color distribution 265 can be associated with, e.g., an object of interest in the image.

Generally, the object of interest can be represented by a set of pixels in the image, where each pixel is associated with a particular intensity (or range of intensities) of red, green, and blue color. The color segmentation model 260 can segment the image such that it includes only those pixels that represent the object of interest. In other words, the model 260 can generate a binary mask including only those pixels that have an intensity (or range of intensities) of red, green, and blue color above a particular threshold.

After generating the binary mask of the image, the color segmentation model 260 can determine a spatial distribution of the binary mask along the x and y axes in the image, and select the mean of the spatial distribution along each of the axes as the representation of the object of interest in the image. Each object (e.g., corresponding to a respective color, or range of colors) in the image can be represented as an embedding having two dimensions, where the first dimension is the mean of the spatial distribution of the binary mask along the x-axis in the image, and the second dimension is the mean of the spatial distribution of the binary mask along the y-axis in the image. The particular color (or color range) representing the object of interest in the image can be estimated and specified manually. Example color segmentation models are described with reference to: Hertweck, Tim, et al., "Simple Sensor Intentions for Exploration," arXiv preprint arXiv:2005.07541 (2020).

Figure 3:
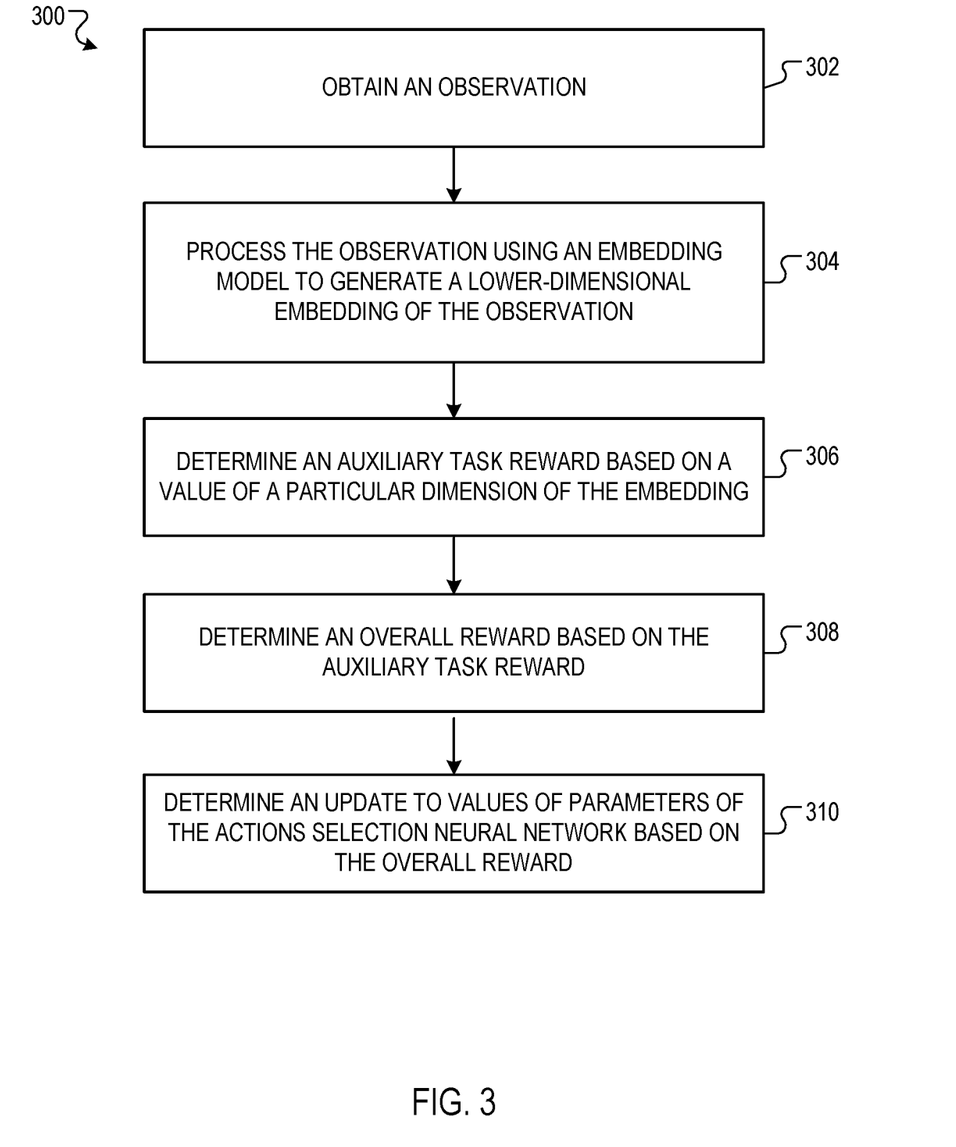
FIG. 3 is a flow diagram of an example process for training an action selection neural network.

FIG. 3 is a flow diagram of an example process 300 for training an action selection neural network. For convenience, the process 300 will be described as being performed by a system of one or more computers located in one or more locations. For example, an action selection system, e.g., the action selection system 100 of FIG. 1, appropriately programmed in accordance with this specification, can perform the process 300.

The system obtains an observation characterizing a state of the environment at a time step (302). The observation can be, e.g., an image.

The system processes the observation using an embedding model to generate a lower-dimensional embedding of the observation (304). The lower-dimensional embedding of the observation can include multiple dimensions. For example, if the observation is an image, the lower-dimensional embedding of the observation can include, e.g., respective coordinates for each of multiple key points in the image, or a set of statistics characterizing a spatial color distribution in the image. The embedding model can include a random matrix, and processing the observation using the embedding model can include applying the random matrix to a vector representation of the observation to generate a projection of the observation (e.g., by flattening the observation into a vector) and applying a non-linear activation function to the projection of the observation.

In some implementations, the embedding model includes an embedding neural network that includes an encoder neural network of an auto-encoder neural network (e.g., a variational auto-encoder neural network, such as β-VAE neural network). In such implementations, processing the observation using the embedding model to generate the lower-dimensional embedding of the observation can include processing the observation using the encoder neural network to generate parameters defining a probability distribution over a latent space, and determining the lower-dimensional embedding of the observation based on a mean of the probability distribution over the latent space.

The system determines an auxiliary task reward for the time step based on a value of a particular dimension of the embedding (306). The auxiliary task reward can correspond to an auxiliary task of controlling the value of the particular dimension of the embedding and can include maximizing or minimizing the value of the particular dimension of the embedding. Determining the auxiliary task reward for the time step can include, at each of multiple time steps, determining a maximum value of the particular dimension of embeddings, determining a minimum value of the particular dimension of embeddings, and determining the auxiliary task reward for the time step based on: (i) the value of the particular dimension of the embedding at the time step, (ii) the maximum value, and (iii) the minimum value.

In some implementations, determining the auxiliary task reward for the time step can include determining a ratio of: (i) a difference between the maximum value corresponding to the particular dimension of the embedding and the value of the particular dimension of the embedding at the time step, and (ii) a difference between the maximum value and the minimum value corresponding to the particular dimension of the embedding, e.g., as described above with reference to equation (1).

In some implementations, determining the auxiliary task reward for the time step can include determining a ratio of: (i) a difference between the value of the particular dimension of the embedding at the time step and the minimum value corresponding to the particular dimension of the embedding, and (ii) a difference between the maximum value and the minimum value corresponding to the particular dimension of the embedding, e.g., as described above with reference to equation (2).

The system determines an overall reward for the time step based at least in part on the auxiliary task reward for the time step (308). In some implementations, the system can determine a main task reward for the time step that corresponds to a main task being performed by the agent in the environment, and determine the overall reward for the time step based on the auxiliary task reward for the time step and the main task reward for the time step.

The system determines an update to values of multiple parameters of the action selection neural network based on the overall reward for the time step using a reinforcement learning technique (310). The reinforcement learning technique can include an off-policy reinforcement learning technique.

In some implementations, the method can further include selecting the auxiliary task of controlling the value of the particular dimension of the embedding from a set of possible auxiliary tasks in accordance with a task selection policy, where each possible auxiliary task corresponds to controlling a value of a respective dimension of the embedding. As discussed, the auxiliary task can be selected from a predetermined set of possible auxiliary tasks, e.g. randomly at each time step, or according to a more sophisticated task selection policy.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which can also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program can, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what can be claimed, but rather as descriptions of features that can be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features can be described above as acting in certain combinations and even initially be claimed as such, one or more features from a claimed combination can in some cases be excised from the combination, and the claimed combination can be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

What is claimed is:

1. A method for training an action selection neural network having a plurality of parameters that is used to select actions to be performed by an agent interacting with an environment, wherein the action selection neural network is configured to process an input comprising an observation characterizing a state of the environment to generate an action selection output that comprises a respective action score for each action in a set of possible actions that can be performed by the agent, and select the action to be performed by the agent from the set of possible actions based on the action scores, the method comprising:
   obtaining an observation characterizing a state of the environment at a time step;
   processing the observation using an embedding model to generate a lower-dimensional embedding of the observation, wherein the lower-dimensional embedding of the observation has a plurality of dimensions;
   determining an auxiliary task reward for the time step based on a value of a particular dimension of the embedding, wherein the auxiliary task reward corresponds to an auxiliary task of controlling the value of the particular dimension of the embedding;
   determining an overall reward for the time step based at least in part on the auxiliary task reward for the time step; and
   determining an update to values of the plurality of parameters of the action selection neural network based on the overall reward for the time step using a reinforcement learning technique.

2. The method of claim 1, wherein the auxiliary task of controlling the value of the particular dimension of the embedding comprises maximizing or minimizing the value of the particular dimension of the embedding.

3. The method of claim 2, wherein determining the auxiliary task reward for the time step comprises:
   determining a maximum value of the particular dimension of embeddings of respective observations characterizing the state of the environment at each of a plurality of time steps;
   determining a minimum value of the particular dimension of embeddings of respective observations characterizing the state of the environment at each of the plurality of time steps; and
   determining the auxiliary task reward for the time step based on: (i) the value of the particular dimension of the embedding at the time step, (ii) the maximum value corresponding to the particular dimension of the embedding, and (iii) the minimum value corresponding to the particular dimension of the embedding.

4. The method of claim 3, wherein determining the auxiliary task reward for the time step comprises:
   determining a ratio of: (i) a difference between the maximum value corresponding to the particular dimension of the embedding and the value of the particular dimension of the embedding at the time step, and (ii) a difference between the maximum value and the minimum value corresponding to the particular dimension of the embedding.

5. The method of claim 3, wherein determining the auxiliary task reward for the time step comprises:
determining a ratio of: (i) a difference between the value of the particular dimension of the embedding at the time step and the minimum value corresponding to the particular dimension of the embedding, and (ii) a difference between the maximum value and the minimum value corresponding to the particular dimension of the embedding.

6. The method of claim 1, further comprising selecting the auxiliary task of controlling the value of the particular dimension of the embedding from a set of possible auxiliary tasks in accordance with a task selection policy, wherein each possible auxiliary task corresponds to controlling a value of a respective dimension of the embedding.

7. The method of claim 1, wherein the reinforcement learning technique is an off-policy reinforcement learning technique.

8. The method of claim 1, wherein the embedding model comprises a random matrix, and processing the observation using the embedding model comprises:
applying the random matrix to a vector representation of the observation to generate a projection of the observation; and
applying a non-linear activation function to the projection of the observation.

9. The method of claim 8, further comprising generating the vector representation of the observation by flattening the observation into a vector.

10. The method of claim 1, wherein the embedding model comprises an embedding neural network.

11. The method of claim 10, wherein the embedding neural network comprises an encoder neural network of an auto-encoder neural network.

12. The method of claim 11, wherein the auto-encoder neural network is a variational auto-encoder (VAE) neural network.

13. The method of claim 12, wherein the variational auto-encoder neural network is a β-variational auto-encoder (β-VAE) neural network.

14. The method of claim 12, wherein processing the observation using the embedding model to generate the lower-dimensional embedding of the observation comprises:
processing the observation using the encoder neural network to generate parameters defining a probability distribution over a latent space; and
determining the lower-dimensional embedding of the observation based on a mean of the probability distribution over the latent space.

15. The method of claim 1, wherein the observation comprises an image and the lower-dimensional embedding of the observation comprises respective coordinates for each of a plurality of key points in the image.

16. The method of claim 1, wherein the observation comprises an image and the lower-dimensional embedding of the observation comprises a set of statistics characterizing a spatial color distribution in the image.

17. The method of claim 1, further comprising:
determining a main task reward for the time step that corresponds to a main task being performed by the agent in the environment; and
determining the overall reward for the time step based on the auxiliary task reward for the time step and the main task reward for the time step.

18. The method of claim 17, wherein the agent is a mechanical agent interacting with a real-world environment, and the main task being performed by the agent comprises physically manipulating objects in the environment.

19. One or more non-transitory computer storage media storing instructions that when executed by one or more computers cause the one or more computers to perform operations for training an action selection neural network having a plurality of parameters that is used to select actions to be performed by an agent interacting with an environment, wherein the action selection neural network is configured to process an input comprising an observation characterizing a state of the environment to generate an action selection output that comprises a respective action score for each action in a set of possible actions that can be performed by the agent, and select the action to be performed by the agent from the set of possible actions based on the action scores, the operations comprising:
obtaining an observation characterizing a state of the environment at a time step;
processing the observation using an embedding model to generate a lower-dimensional embedding of the observation, wherein the lower-dimensional embedding of the observation has a plurality of dimensions;
determining an auxiliary task reward for the time step based on a value of a particular dimension of the embedding, wherein the auxiliary task reward corresponds to an auxiliary task of controlling the value of the particular dimension of the embedding;
determining an overall reward for the time step based at least in part on the auxiliary task reward for the time step; and
determining an update to values of the plurality of parameters of the action selection neural network based on the overall reward for the time step using a reinforcement learning technique.

20. A system comprising:
one or more computers; and
one or more storage devices communicatively coupled to the one or more computers,
wherein the one or more storage devices store instructions that, when executed by the one or more computers, cause the one or more computers to perform operations for training an action selection neural network having a plurality of parameters that is used to select actions to be performed by an agent interacting with an environment, wherein the action selection neural network is configured to process an input comprising an observation characterizing a state of the environment to generate an action selection output that comprises a respective action score for each action in a set of possible actions that can be performed by the agent, and select the action to be performed by the agent from the set of possible actions based on the action scores, the operations comprising:
obtaining an observation characterizing a state of the environment at a time step;
processing the observation using an embedding model to generate a lower-dimensional embedding of the observation, wherein the lower-dimensional embedding of the observation has a plurality of dimensions;
determining an auxiliary task reward for the time step based on a value of a particular dimension of the embedding, wherein the auxiliary task reward corresponds to an auxiliary task of controlling the value of the particular dimension of the embedding;

determining an overall reward for the time step based at least in part on the auxiliary task reward for the time step; and determining an update to values of the plurality of parameters of the action selection neural network based on the overall reward for the time step using a reinforcement learning technique.

* * * * *